Sept. 20, 1932.   J. D'A. CLARK   1,878,109
MEANS FOR DETERMINING THE MOISTURE CONTENT AND QUALITY OF MATERIALS
Filed April 28, 1927   2 Sheets-Sheet 1

Inventor,
J. D. Clark
Per A. S. Pattison & Son
Attys

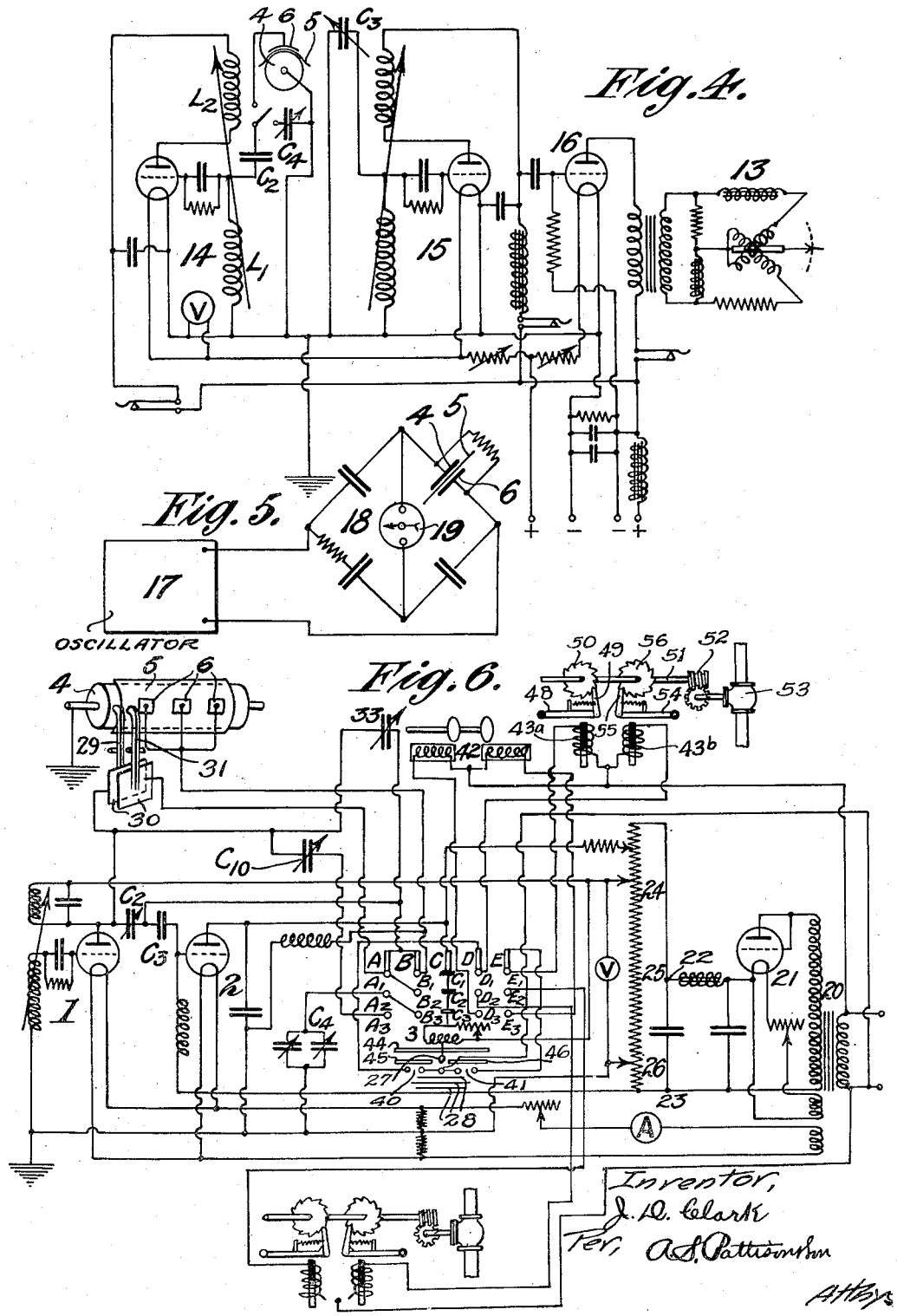

Patented Sept. 20, 1932

1,878,109

UNITED STATES PATENT OFFICE

JAMES D'ARGAVILLE CLARK, OF KENSINGTON, ENGLAND

MEANS FOR DETERMINING THE MOISTURE CONTENT AND QUALITY OF MATERIALS

Application filed April 28, 1927, Serial No. 187,405, and in Great Britain May 18, 1926.

This invention relates to a means for determining the quality such as the moisture content or thickness of materials such as paper, cellulose and air.

According to the present invention means for measuring or indicating the quality such as the moisture content or thickness of materials comprises an electrical circuit including electrical oscillation producing means and means to vary a condition of said circuit comprising a condenser where of the dielectric consists of the material whose quality is to be measured or indicated and means to measure or indicate said condition. By substituting for the material whose quality is to be measured a piece of similar material but in a perfectly dry condition and with other conditions the same the condition of the electrical circuit will be varied and the difference between the two cases is a measure of the quality of the material.

The condenser may be connected to an inductance and electrical oscillation producing means in an electrical oscillatory circuit and the condition which is varied by the condenser is the frequency of the oscillations in the circuit; the means to measure or indicate said condition comprises means to measure the frequency of the oscillations in the circuit.

According to a modification of the invention the condenser is connected between the oscillation producing means and a rectifier and means is provided to measure or indicate the current passing through the rectifier such as a galvanometer.

In a modified arrangement the condenser may be connected at one side to the oscillation producing means and to the rectifier and at the other side to the other side of the rectifier or to earth when one side of the rectifier is earthed. Thus when the oscillation producing means and the rectifier comprise thermionic tubes their filaments will be connected together and earthed and one side of the condenser will be earthed.

A test condenser may be provided with switching means to connect it in the circuit in place of the condenser whose dielectric consists of the material under test. The test condenser may be set so that when connected into the circuit the reading of the means to measure or indicate the condition of the circuit will be that which should be obtained when the dielectric under test is of the required quality. Thus the test condenser provides a standard of reference for the condition of the circuit.

The present invention may be applied to the control of the thickness, texture and moisture content of paper during its manufacture.

For this purpose the condenser is constituted by a metal roll of a paper making machine, a plate or roll disposed in proximity to said roll and the paper web or sheet as the dielectric. Preferably the face of the plate adjacent the roll is of a shape to conform to the roll.

When the condenser is employed as part of an oscillatory circuit according to a further feature of the invention the means to measure the frequency of the oscillations produced therein consists in a second oscillatory circuit having a frequency approaching that of the main oscillatory circuit and which is heterodyned with the main oscillatory circuit to produce a beat note of the difference in frequencies of the two circuits. A small change in the frequency of the oscillatory circuit due for example to an alteration in the texture, thickness or moisture content of the material forming the dielectric of the condenser will immediately change the beat note. The frequency of the beat note may be measured by a frequency meter or in any other known and convenient manner, if desired after amplification.

Forms of the present invention will now be described with reference to the accompanying drawings wherein:—

Figure 1:
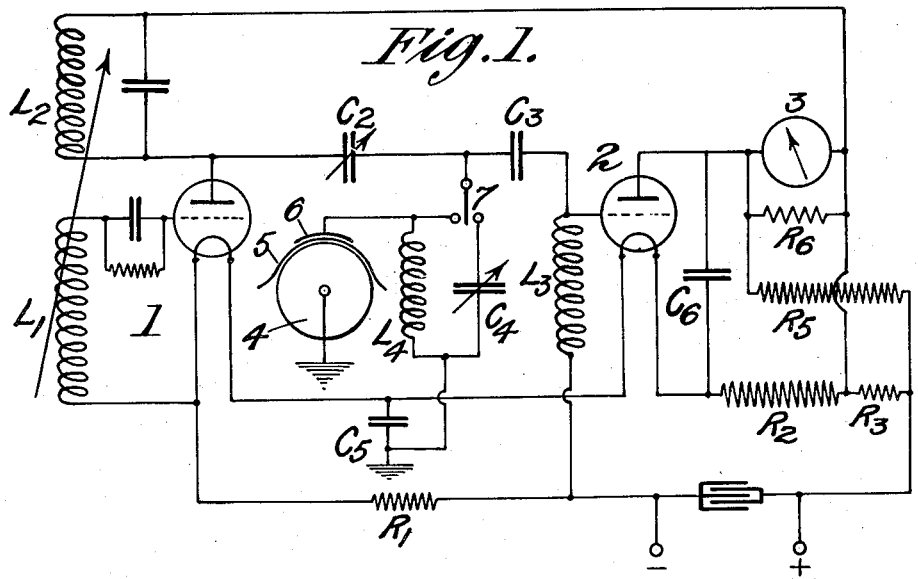
Fig. 1 illustrates the application of the invention to a paper making machine.
Figure 2:
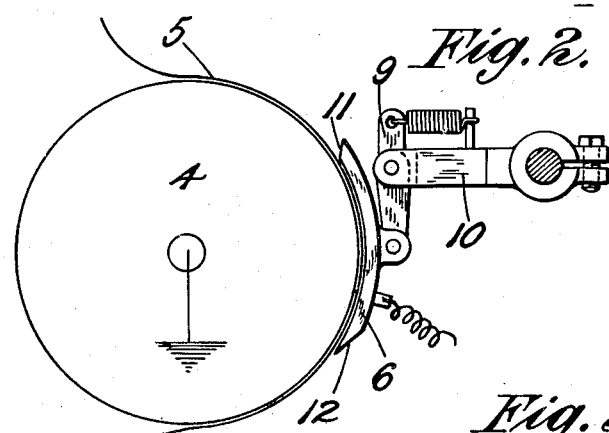
Fig. 2 illustrates to a larger scale a metal roll of the paper making machine and the plate in proximity to said roll with the paper web or sheet passing therebetween.

Referring to Fig. 1, 1 indicates a valve oscillator of usual form whose anode is connected through condensers $C_2$ and $C_3$ to the grid of a rectifying valve 2. The plate of the rectifying valve is connected to indicating means such as a galvanometer 3. 4 is a metal roll of a paper-making machine. 5 is the paper web and 6 is a metal plate which is shaped on its under surface to conform to the shape of the roll and which bears on the paper web. The plate is pressed into contact with the paper by a spring controlled arm 9 pivotally mounted on a support 10. The arm 9 is of insulating material, such as fibre, or is insulatingly mounted. The arrangement of the roll 4 and plate 6 is shown more clearly in Fig. 2. The planes of opposite edges, e. g. 11 and 12, are such that wear of the plate will not cause variations in the surface area and are bevelled to assist the passage of the paper under the plate.

A plurality of such plates may be arranged to co-operate with the roll and means provided such as levers, eccentrics or other mechanism to withdraw them from or replace them on the roll as desired. The plates may be insulated from each other or connected electrically to form a single condenser. The plate 6, metal roll 4 and paper web 5 form a condenser whereof the dielectric is constituted by the paper 5 and said condenser is connected at one side to the junction of the condensers $C_2$ and $C_3$ and at the other side to earth, the metal roll of the paper making machine constituting the earth connection. An inductance $L_4$ is connected in parallel with the condenser 4, 5, 6, for the purpose of preventing the accumulation of static electricity.

The filaments of the rectifier and oscillatory valve are connected to earth through the condenser $C_5$.

$C_4$ is a variable test condenser which may be connected in the circuit in place of the condenser 4, 5, 6, by the switch 7. $R_6$ is a resistance shunt for the galvanometer and said shunt may be variable. $R_3$ provides a small current bias to the galvanometer 3 opposing the steady plate current through the instrument.

The condenser $C_6$ is provided to by-pass any radio frequencies and usually may be omitted.

The parts of the apparatus may be enclosed in an earthed casing to prevent stray capacity effects.

The operation of the apparatus is as follows. With the switch 7 in the position connecting the condenser 4, 5, 6, to the valve oscillator 1, the oscillations produced pass to said condenser and to the rectifier 2 and the current passed to the galvanometer 3 is a measure of the current passed to the rectifier. Any change in the substance, thickness or moisture content of the paper coming from the machine will cause an alteration in the capacity of the condenser 4, 5, 6, whereby the condition of the electrical circuit is varied, that is the current passed to the rectifier 2 will be varied with a consequent variation in the reading of the galvanometer 3. The variation in the reading of the galvanometer 3 immediately draws attention to the change in the paper so that the operating conditions may be readily controlled and a uniform product obtained.

The condenser $C_4$ is of known value and constitutes a test condenser. By moving the switch to substitute it for the condenser 4, 5, 6, the operation of the circuit may be tested and the galvanometer 3 calibrated. This condenser is preferably set so that when connected into the circuit its reading will be that which should be obtained when the paper is of the required quality.

In place of the galvanometer 3 a recording instrument may be employed which may be arranged to record alternately readings with the condenser 4, 5, 6, connected into the circuit and with the condenser $C_4$ connected into the circuit. The variation of the curve produced when the condenser 4, 5, 6, is connected into the circuit from the curve produced by connecting the condenser $C_4$ into the circuit is a measure of the variation in the quality of the paper from the required quality. Such an arrangement is embodied in the form of the invention illustrated in Fig. 6.

With the arrangement shown in Fig. 1, voltage variations of the mains produce a proportionate variation of the bias current through the galvanometer 3, and also of the current through $R_1$ with a consequent variation of the negative bias on the valve 2. The variations in the voltage of the mains also produce variations in the anode currents of the valves and their filament emissions. The two sets of effects thus due to variation in the voltage of the mains are opposed and by suitable adjustments of the resistances $R_1$, $R_2$ and $R_3$ the effect on the galvanometer reading of small variations of the voltage may be reduced to a minimum or entirely eliminated.

It is found that the coupling between the coils $L_1$, $L_2$ also may be so fixed that automatic compensation of small voltage variations of the mains is provided.

In a modified arrangement of the circuit shown in Fig. 1, the condensers 4, 5, 6, and $C_4$ and the inductance $L_4$ may be connected in place of the condenser $C_2$, and the plate of the valve 1 connected to earth.

Figure 3:
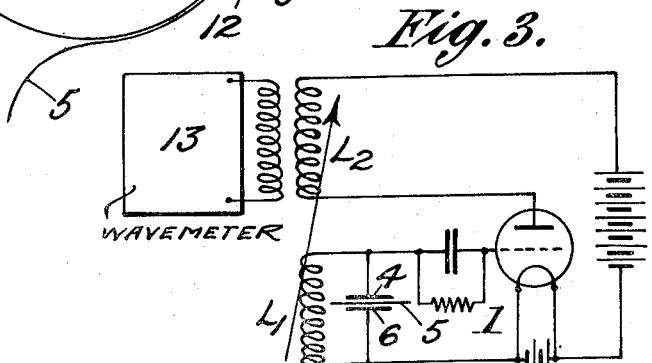
Fig. 3 illustrates a modification of the invention, and Figs. 4, 5, and 6 further modifications.

Fig. 3 shows a modification of the invention in which the paper condenser 4, 5, 6, is connected in parallel with the inductance $L_1$ of the valve oscillator 1. In this case the condition of the circuit which is varied by a change in the value of the condenser 4, 5, 6, is the frequency of the oscillations in the circuit. The condition of the circuit is measured or indicated by a frequency or wave meter 13.

Referring now to Fig. 4, 14 indicates a valve oscillator of usual form with the paper condenser 4, 5, 6, connected across the coil $L_1$. 15 is a second valve oscillator having a frequency approaching that of the oscillator 14 and which is heterodyned therewith to produce a beat note of the difference in frequencies of the two circuits. An alteration in the value of the condenser 4, 5, 6, produces a change in the frequency of the oscillatory circuit 14 whereby the beat note is immediately varied. The beat note voltage is amplified by the amplifier 16 and its frequency measured or indicated by the low-frequency frequency meter 13.

In Fig. 5, 17 indicates a tuning fork controlled valve oscillator to give a constant frequency. This frequency is applied to a capacity bridge indicated at 18 wherein the paper condenser 4, 5, 6, constitutes one arm. 19 is an indicating or recording instrument which will show a variation of the E. M. F. across the points of the bridge to which it is connected. Alteration in the capacity of the condenser 4, 5, 6, will produce an alteration in the E. M. F. between the points at which the indicator 19 is connected. The indicator 19 may comprise a thermo-galvanometer or a vibration galvanometer. Any type of capacity bridge may be employed and if desired the changes of E. M. F. between the points of the bridge at which the indicator 19 is shown connected in the diagram may be amplified.

In Fig. 6 the apparatus is similar to that shown in Fig. 1. 1 is the valve oscillator and 2 the rectifying valve. 4, 5, 6, is the paper condenser of which 4 is the roll of the paper making machine and 6, 6, 6, three plates mounted in proximity thereto and connected together electrically. 29 indicates an arm one end of which bears on the roll 4 and the other end carries one plate of a condenser 30. 31 indicates a pivoted lever one end of which bears on the paper 5 and the other end carries the other plate of the condenser 30. The arm 29 and the pivoted lever 31 are made of non-current carrying material and have no electrical contact with the plates 6, 6, 6. Thus any variation in the substance or thickness of the paper produces a variation in the capacity of the condenser 30. It will be understood that other means of varying the capacity of the condenser 30 in accordance with variations in the substance or thickness of the paper may be employed. The indicating apparatus 3 comprises a thread recorder of known type which will automatically record the current passing through a number of separate circuits. The instrument includes an indicating arm or pointer 27 indicated diagrammatically which moves over a chart and a plurality of different coloured threads 28 mounted on a frame which is moved by clockwork to bring them one at a time under a member 44 which is then depressed by clockwork to engage the pointer and press it on to said thread to produce a mark on the chart. As each thread is brought under the operating member 44 a particular circuit is connected to the instrument and thus an indication is given on the chart of the current passing through that circuit.

In the present case the instrument includes five contacts A, B, C, D, E, mounted to be moved together and each over a set of three fixed contacts in accordance with the movement of the frame carrying the coloured threads. The fixed contacts are indicated at $A_1$, $A_2$, $A_3$; $B_1$, $B_2$, $B_3$; etc. The movable contacts A and B are connected together electrically and to the junction of the condensers $C_2$ and $C_3$. One plate of the condenser 30 is connected to the contact $A_1$, the plates 6 to the contact $B_1$, and the other plate of the condenser 30 to the plate of the valve 1. The test condenser $C_4$ in the present case comprises a pair of condensers, one of small capacity to constitute a fine adjustment, and is connected at one side to the contact $A_2$. The contact $A_1$ is connected to the contact $B_2$ and the contact $A_2$ to the contact $B_3$. Thus in the first position when the contacts A and B engage the contacts $A_1$ and $B_1$ the condenser 30 is connected in parallel with the coupling condenser $C_2$ and the paper condenser 4, 5, 6, in the circuit between the valve 1 and the valve 2; in the second position when the contacts A and B engage the contacts $A_2$ and $B_2$ the condenser 30 is connected in parallel with the coupling condenser $C_2$ and the test condenser unit in the circuit between the valve 1 and the valve 2; and in the third position when the contacts A and B engage the contacts $A_3$ and $B_3$ the test condenser and the condenser $C_{10}$ connected in the circuit between the valve 1 and the valve 2 without the paper condenser 4, 5, 6 or the condenser 30 but with a small condenser $C_{10}$.

The contact C engages the contacts $C_1$, $C_2$, $C_3$ each of which are connected to the indicating instrument 3 and the contact C is connected to the plate of the valve 2. The contact C is so arranged that it engages the contact $C_1$, $C_2$ or $C_3$ a short interval after the engagement of the contacts A and B with their corresponding fixed contacts. For this purpose the contacts $C_1$, $C_2$ and $C_3$ are smaller than the fixed contacts engaged by the contacts A, B and are so indicated in the drawings. The contacts D and E are connected together through two pairs of relay contacts 40 and 41 and the junction of said relay contacts is connected to one side of the supply to the transformer 20. 45 and 46 indicate means to close the relay contacts 40 and 41 respectively, and constituted by bars spaced from the member 44 so that the pointer 27 can move between said member 44 and either bar. Said bars 45 and 46 are spaced apart at the neutral position of the pointer 27. 42 indicates electrically operated apparatus for adjusting a variable condenser 33. It comprises a pair of solenoid coils connected in series and to the contacts $D_3$ $E_3$, and having, for example, plungers $42a$ which operate through racks and toothed wheels on to the spindle carrying the movable condenser plates. 43 likewise indicates electrically operated apparatus for adjusting the supply of steam to the paper making machine. It comprises a pair of solenoid coils $43a$ and $43b$ connected in series and to the contacts $D_1$ and $E_1$. The junction of the two coils of the apparatus 42 and the two coils of the apparatus 43 are connected together and to the other side of the supply. The plunger of the solenoid $43a$ operates to move an arm 48 carrying a pawl 49 which engages a ratchet wheel 50 mounted on a shaft 51 connected through gearing 52 to a valve 53. The plunger of the solenoid $43b$ similarly operates to move an arm 54 carrying a pawl 55 which engages a ratchet wheel 56 also mounted on the shaft 51. The arrangement is such that when one solenoid is energized the valve 53 is opened and when the other solenoid is energized said valve is closed. The condenser 33 is connected in parallel with the condenser $C_2$.

In operation the instrument 3 is so arranged that when its pointer is in the neutral position, that is when the current flowing through it is that which should flow when the paper passing under the plate 6 is of the required quality, (such current is referred to as the "standard" current) the relay contacts 40 and 41 remain open. Should the current through the instrument 3 vary from the "standard" the pointer 27 will move to one side or the other so that when the member 44 is depressed one of the bars 45 or 46 will be moved to close the contacts 40 or 41. When the contacts A to E are in the position 1, that is engaging the contacts $A_1$ to $E_1$, the paper condenser 4, 5, 6, is connected between the valves 1 and 2 and consequently the instrument indicates the moisture content of the paper, a record of which is obtained on the chart. Should this differ from the normal required the pointer 27 will move from the neutral position and one of the contacts 40 or 41 will be closed so that current will be supplied to one or other of the solenoids $43a$ and $43b$ and the steam valve 53 operated to correct the moisture content. Any variation in the thickness of the paper during this time is compensated for by variation of the condenser 30. Similarly a record is obtained on the chart when the contacts A to E are in the third position that is engaging the contacts $A_3$ to $E_3$ to connect the test condenser between the valves 1 and 2 and should the current through the instrument 3 vary from the "standard" the pointer will move away from the neutral position and cause one or other of the contacts 40 or 41 to be closed and the apparatus 42 to operate and adjust the condenser 33. When the contacts A to E are in the second position a record is obtained on the chart of the thickness or substance of the paper; the contacts $D_2$ and $E_2$ are connected to electrically operated apparatus exactly similar to that illustrated and described for operating the steam valve 53, to control the stuff control to the paper making machine.

The circuit is shown as supplied from alternating current mains through a transformer 20 and 21 is a restifying valve connected to said transformer.

The high tension voltage supplied by the rectifier 21 is applied to the points 22, 23 across which are connected the resistances 24, 25 and 26 in series. The resistance 24 provides a small bias current through the indicating instrument 3, the resistance 25 provides the high tension to the valves 1 and 2, and the resistance 26 provides the negative bias for the valve 2.

It will be understood that the compensating device illustrated in Fig. 6 may be applied to an arrangement having a direct current supply.

Attention is directed to the fact that the structure shown in Fig. 6 is an example of how compensation for the thickness of the material or paper can be effected, but that other constructions or methods for compensating for thickness can be used or substituted without departing from the spirit of the invention. For example, there could be employed a choke embedded in the moisture plates and using the resulting differences in an A. C. current which would thereby be dependent on the gap in the magnetic circuit caused by the thickness of the paper, to effect the necessary compensation.

Though the invention has been described as applied to a continuous web paper-making machine it will be understood that the condenser 4, 5, 6, may be a separate structure which is added to a paper making machine or which is used apart therefrom. In the latter case samples of paper will be placed between the parts 4 and 6 constituting the plates of the condenser, and both of which may be flat plates, and an indication of the quality of the paper obtained. Other materials than paper may be tested. The indicator may be calibrated by substituting a sample of the same material of standard thickness, texture and moisture content. It will also be understood that the invention may be employed in controlling the quality of other materials than paper made in a continuous web.

It will be understood that any number of indicators may be connected in series and placed at distant and convenient points.

Various modifications may be made without departing from the invention. For example, other means of producing the electrical oscillations may be employed than a thermionic tube, such as a high frequency generator or an arc generator. In place of or in addition to the indicating devices for use on a paper making machine an electrical relay may be connected so that when the quality of the paper varies from that required a circuit is closed by means of which an audible or other warning is given. The plate or plates 4 may be of other shape than rectangular, e. g. diamond shape, round or elliptical. In the arrangement shown in Fig. 1 the valve 1 may be given a negative grid bias.

In carrying out the invention the plates between which the material whose quality is to be measured is placed need not touch said material.

What I claim is:—

1. Means for indicating a quality of a material comprising electrical oscillation producing means, a rectifier, a condenser whereof the dielectric consists of the material whose quality is to be measured connected at one side to the oscillation producing means and to the rectifier and at the other side to the other side of the rectifier, and means to indicate the current passing through the rectifier.

2. Means for indicating a quality of a material comprising electrical oscillation producing means, a rectifier, a condenser whereof the dielectric consists of the material whose quality is to be measured connected at one side to the oscillation producing means and to the rectifier and at the other side to the other side of the rectifier, means to indicate the current passing through the rectifier, a test condenser and means to connect it into the circuit in place of the condenser whose dielectric consists of the material under test.

3. Means for indicating a quality of a material comprising an electrical circuit, electrical oscillation producing means in said circuit, a condenser in said circuit to vary a condition thereof whereof the dielectric consists of the material whose quality is to be measured, means to indicate the condition of the circuit which is varied by alteration of the capacity of the condenser, a test condenser, means to connect it into the circuit in place of the condenser whose dielectric consists of the material under test, variable means to compensate for variations in conditions of the circuit, a motor to adjust said means, contacts in the motor circuit and means to close said contacts operated by the variation of the current flowing in the circuit when the test condenser is connected from the current which flows when the first condenser is connected and the dielectric thereof is of the required quality.

4. Means for indicating a quality of a material comprising electrical oscillation producing means, a rectifier, a condenser whereof the dielectric consists of the material whose quality is to be measured connected at one side to the oscillation producing means and the rectifier and at the other side to the other side of the rectifier, means to indicate the current passing through the rectifier, a test condenser, means to connect it into the circuit in place of the condenser whose dielectric consists of the material under test, variable means to compensate for variations in conditions of the circuit, a motor to adjust said means, contacts in the motor circuit and means to close said contacts operated by the variation of the current flowing in the circuit when the test condenser is connected from the current which flows when the first condenser is connected and the dielectric thereof is of the required quality.

5. Means for indicating a quality of a material comprising electrical oscillation producing means, a rectifier, a condenser whereof the dielectric consists of the material whose quality is to be measured connected at one side to the oscillation producing means and to the rectifier and at the other side to the other side of the rectifier, a second condenser whose capacity is varied automatically directly with the thickness of the material, connected at one side to the oscillation producing means and at the other side to the rectifier and means to indicate the current passing through the rectifier.

6. Means for indicating a quality of a material comprising electrical oscillation producing means, a rectifier, a condenser whereof the dielectric consists of the material whose quality is to be measured connected at one side to the oscillation producing means and to the rectifier and at the other side to the other side of the rectifier, a second condenser whose capacity is varied automatically directly with the thickness of the material, connected at one side to the oscillation producing means and at the other side to the rectifier, means to indicate the current passing through the rectifier, a test condenser and means to connect it into a circuit in place of the condenser whose dielectric consists of the material under test.

7. Means for indicating a quality of a material comprising electrical oscillation producing means, a rectifier, a first condenser whereof the dielectric consists of the material whose quality is to be measured connected at one side to the oscillation producing means and to the rectifier and at the other side to the other side of the rectifier, a second condenser whose capacity is varied automatically directly with the thickness of the material, connected at one side to the oscillation producing means and at the other side to the rectifier, means to indicate the current passing through the rectifier, a test condenser in two parts and means to connect one part in place of the first condenser and the other part in place of the second condenser.

8. Means for indicating a quality of a material comprising electrical oscillation producing means, a rectifier, a first condenser whereof the dielectric consists of the material whose quality is to be measured connected at one side to the oscillation producing means and to the rectifier and at the other side to the other side of the rectifier, a second condenser whose capacity is varied automatically directly with the thickness of the material, connected at one side to the oscillation producing means and at the other side to the rectifier, means to indicate the current passing through the rectifier, a test condenser in two parts, means to connect said test condenser in the circuit in place of the first condenser, variable means to compensate for variation in conditions of the circuit, a motor to adjust said means contacts in the motor circuit and means to close said contacts operated by the variation of the current flowing in the circuit when the test condenser is connected from the current which flows when the first condenser is connected and the dielectric thereof is of the required quality.

9. In a machine for manufacturing material in the form of a web means for indicating a quality of the material, comprising electrical oscillation producing means, a rectifier, a conducting member disposed in proximity to a second conducting member the web passing between said members and constituting therewith a condenser connected at one side to the oscillation producing means and to the rectifier and at the other side to the other side of the rectifier, and means to indicate the current passing through the rectifier.

10. In a machine for manufacturing material in the form of a web means for indicating a quality of the material comprising electrical oscillation producing means, a rectifier, a conducting member disposed in proximity to a second conducting member the web passing between said members and constituting therewith a first condenser connected at one side to the oscillation producing means and to the rectifier and at the other side to the other side of the rectifier, a second condenser whose capacity is varied automatically directly with the thickness of the material, connected at one side to the oscillation producing means and at the other side to the rectifier and means to indicate the current passing through the rectifier.

11. In a machine for manufacturing material in the form of a web means for indicating a quality of the material, comprising electrical oscillation producing means, a rectifier, a conducting member disposed in proximity to a second conducting member, the web passing between said members and constituting therewith a first condenser, a third member operatively connected to a movable plate of a second condenser and disposed in proximity to the second conducting member, the web passing between said second and third members and causing the capacity of the second condenser to be varied automatically directly with the thickness of the material, one of said condensers connected at one side to the oscillation producing means and to the rectifier, and at the other side to the other side of the rectifier and the other of said condensers connected at one side to the oscillation producing means and at the other side to the rectifier and means to indicate the current passing through the rectifier.

12. In a machine for manufacturing material in the form of a web means for indicating a quality of the material, comprising electrical oscillation producing means, a rectifier, a conducting member disposed in proximity to a second conducting member the web passing between said members and constituting therewith a condenser connected at one side to the oscillation producing means and to the rectifier and at the other side to the other side of the rectifier, means to indicate the current passing through the rectifier, a test condenser and means to connect it into the circuit in place of the condenser whose dielectric consists of the material under test.

13. In a machine for manufacturing material in the form of a web means for indicating a quality of the material, comprising electrical oscillation producing means, a rectifier, a conducting member disposed in proximity to a second conducting member, the web passing between said members and constituting therewith a first condenser, a third member operatively connected to a movable plate of a second condenser and disposed in proximity to the second conducting member, the web passing between said second and third members and causing the capacity of the second condenser to be varied automatically with the thickness of the material, one of said condensers connected at one side to the oscillation producing means and to the rectifier, and at the other side to the other side of the rectifier and the other of said condensers connected at one side to the oscillation producing means and at the other side to the rectifier, means to indicate the current passing through the rectifier, a test condenser and means to connect it into the circuit in place of the condenser whose dielectric consists of the material under test.

14. In a machine for manufacturing material in the form of a web means for indicating a quality of the material, comprising electrical oscillation producing means, a rectifier, a conducting member disposed in proximity to a second conducting member, the web passing between said members and constituting therewith a first condenser, a third member operatively connected to a movable plate of a second condenser and disposed in proximity to the second conducting member, the web passing between said second and third members and causing the capacity of the second condenser to be varied automatically directly with the thickness of the material, one of said condensers connected at one side to the oscillation producing means and to the rectifier, and at the other side to the other side of the rectifier, and the other of said condensers connected at one side to the oscillation producing means and at the other side to the rectifier, means to indicate the current passing through the rectifier, a test condenser in two parts and means to connect said test condenser into the circuit in place of the first condenser.

15. In a machine for manufacturing material in the form of a web, means for indicating a quality of the material, comprising electrical oscillation producing means, a rectifier, a conducting member disposed in proximity to a second conducting member the web passing between said members and constituting therewith a condenser connected between the oscillation producing means and the rectifier, means to indicate the current passing through the rectifier, a test condenser, means to connect it into the circuit in place of the condenser whose dielectric consists of the material under test, variable means to compensate for variations in the conditions of the circuit, a motor to adjust said means, contacts in the motor circuit and means to close said contacts operated by the variation of the current flowing in the circuit when the test condenser is connected from the current which flows when the first condenser is connected and the dielectric thereof is of the required quality.

16. In a machine for manufacturing material in the form of a web, means for indicating a quality of the material, comprising electrical oscillation producing means, a rectifier, a conducting member disposed in proximity to a second conducting member, the edge of one conducting member being beveled and the web passing between said members and constituting therewith a condenser connected at one side to the oscillation producing means and to the rectifier and at the other side to the other side of the rectifier, and means to indicate the current passing through the rectifier.

17. Means for indicating a quality of a material comprising electrical oscillation producing means, a rectifier, a condenser whereof the dielectric consists of the material whose quality is to be measured connected at one side of the oscillation producing means and to the rectifier and at the other side to the other side of the rectifier, means to vary the conditions of the electrical circuit in accordance with the thickness of the material and means to indicate the current passing through the rectifier.

18. In a machine for manufacturing material in the form of a web, means for indicating a quality of the material comprising electrical oscillation producing means, a rectifier, a conducting member disposed in proximity to a second conducting member, the web passing between said members and constituting therewith a condenser connected at one side to the oscillation producing means and to the rectifier and at the other side to the other side of the rectifier, means to vary the conditions of the electrical circuit in accordance with the thickness of the web and means to indicate the current passing through the rectifier.

Dated this 8th day of April, 1927.

JAMES D'ARGAVILLE CLARK.